United States Patent
Severinski et al.

[11] Patent Number: 5,951,039
[45] Date of Patent: Sep. 14, 1999

[54] SIDE AIRBAG CLOSEOUT ASSEMBLY FOR VEHICULAR SEATS AND METHOD OF INSTALLATION

[75] Inventors: Paul S. Severinski, Southgate; G. Lane Johnson, III, Waterford, both of Mich.

[73] Assignee: Lear Corp., Southfield, Mich.

[21] Appl. No.: 09/106,644

[22] Filed: Jun. 29, 1998

[51] Int. Cl.[6] .................................................. B60R 21/22
[52] U.S. Cl. ................................ 280/730.2; 280/728.2; 280/728.3
[58] Field of Search .............................. 280/728.2, 730.2, 280/728.1, 728.3, 730.1

[56] References Cited

U.S. PATENT DOCUMENTS

| | | |
|---|---|---|
| 3,669,499 | 6/1972 | Semplonius et al. . |
| 4,637,650 | 1/1987 | Inoue . |
| 4,643,480 | 2/1987 | Morita . |
| 4,786,103 | 11/1988 | Selbert . |
| 4,867,507 | 9/1989 | Arai . |
| 5,009,469 | 4/1991 | Mouri . |
| 5,112,079 | 5/1992 | Haland et al. . |
| 5,248,356 | 9/1993 | Shimada . |
| 5,348,342 | 9/1994 | Haland et al. . |
| 5,364,170 | 11/1994 | West . |
| 5,419,579 | 5/1995 | McPherson et al. . |
| 5,503,428 | 4/1996 | Awotwi et al. . |
| 5,505,489 | 4/1996 | Bollaert et al. ................. 280/730.2 |
| 5,586,782 | 12/1996 | Zimmerman, III et al. . |
| 5,601,332 | 2/1997 | Schultz et al. . |
| 5,651,582 | 7/1997 | Nakano . |
| 5,667,242 | 9/1997 | Slack et al. . |
| 5,683,101 | 11/1997 | Davis et al. ................. 280/730.2 |

*Primary Examiner*—Eric Culbreth
*Attorney, Agent, or Firm*—MacMillan, Sobanski & Todd, LLC; A. Michael Tucker

[57] ABSTRACT

A vehicular seat assembly includes a seat bottom defining an occupant seating area. The seat bottom includes a cushion covered by a trim cover spanning opposed lateral sides of the seat bottom. A seat back defines an occupant back support and includes a cushion covered by a trim cover spanning opposed lateral sides of the seat back. An opening is formed in the cushion at one of the lateral sides of the seat back. An opening is formed in the trim cover at one of the lateral sides of the seat back. A cup is received in the opening formed in the cushion. A retaining ring is secured to the trim cover about the opening formed in the trim cover and attached to the cup.

16 Claims, 7 Drawing Sheets

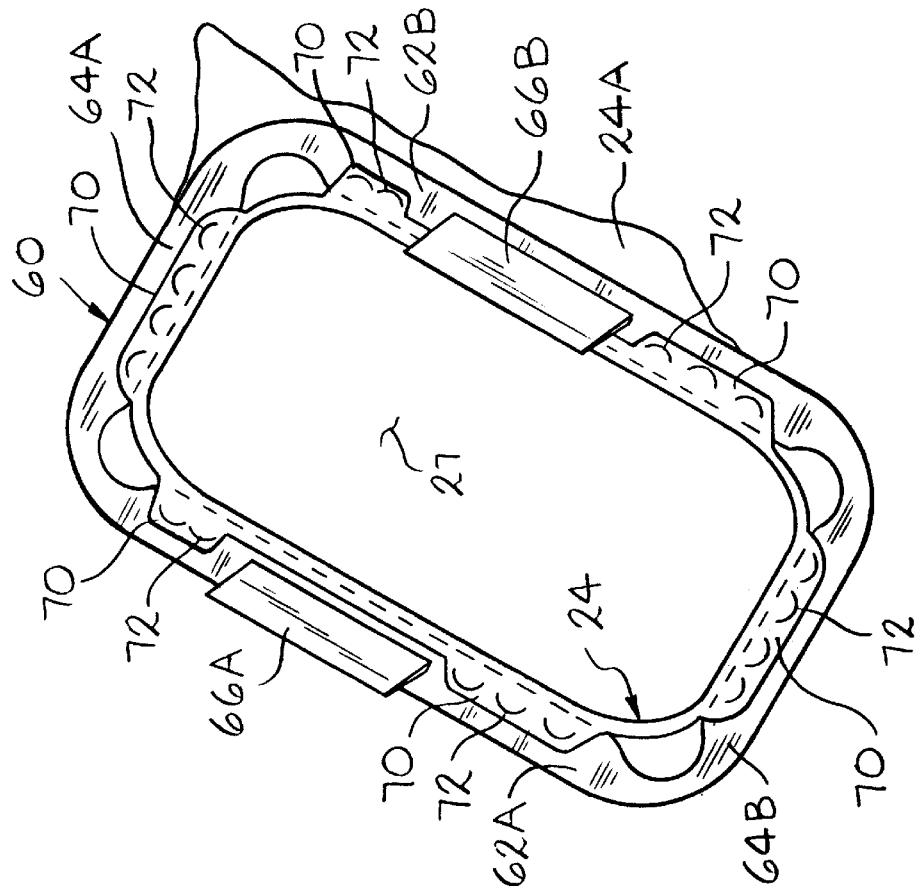
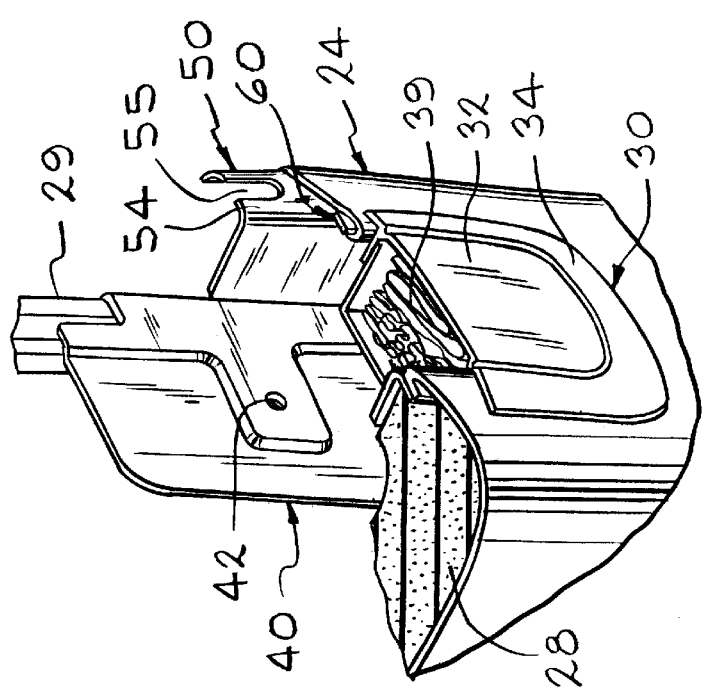

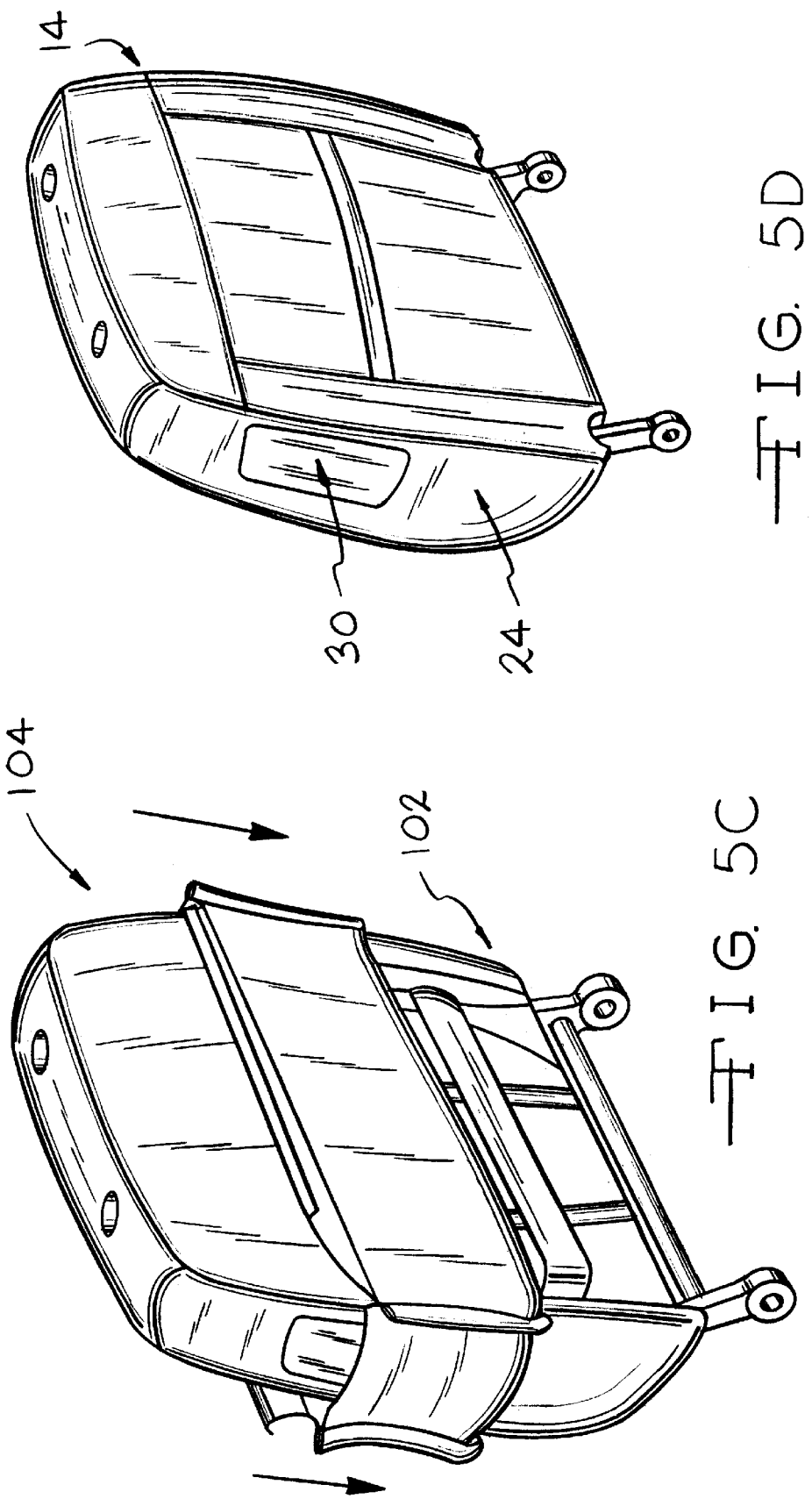

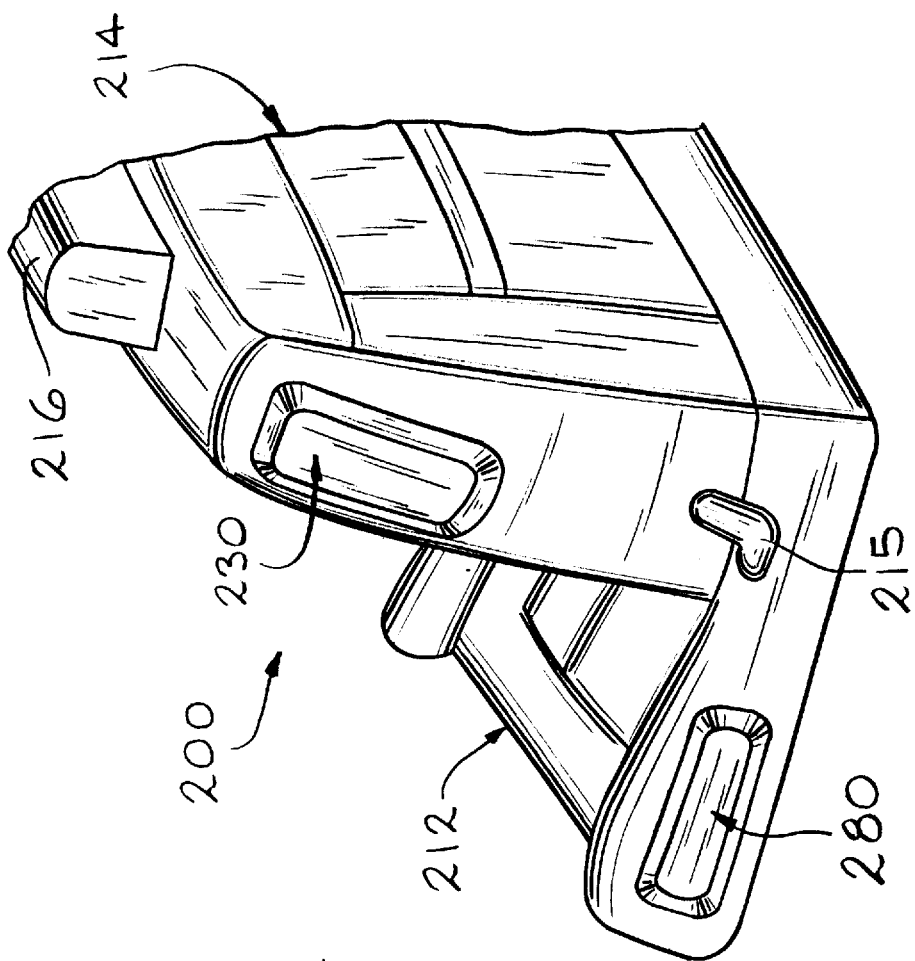
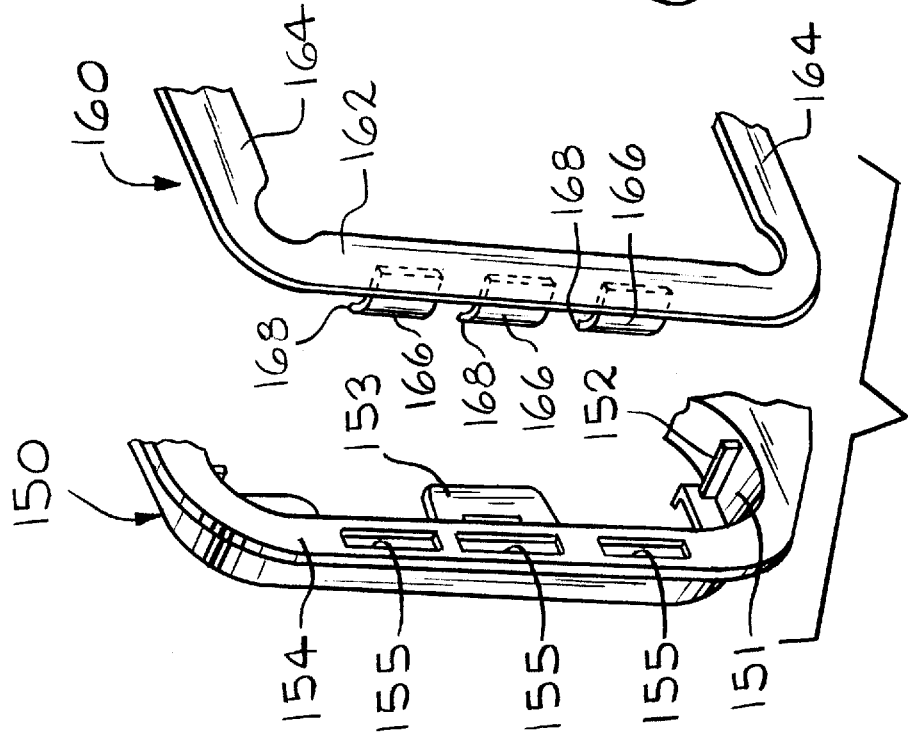

SIDE AIRBAG CLOSEOUT ASSEMBLY FOR VEHICULAR SEATS AND METHOD OF INSTALLATION

BACKGROUND OF THE INVENTION

This invention relates in general to seats for passenger vehicles, and in particular is concerned with a closeout assembly for a side air bag module mounted on a vehicular seat and a method of installing the closeout assembly.

A common vehicular bucket seat includes a seat bottom and a seat back. Each of the seat bottom and seat back includes a frame assembly supporting a resilient material such as a foam cushion. Foam cushions are commonly made from polyester. A trim cover encases each frame assembly and corresponding foam cushion. Trim covers are typically formed from cloth fabric, vinyl, and leather.

To provide a pleasing appearance, trim covers are formed into envelopes by sewing panels together. Such envelopes eliminate the need for zippers or other fasteners used in prior seat constructions. To complete a seat back or bottom, an envelope is first inverted. Next, a frame assembly and its supported foam cushion are inserted into the inverted envelope in a known method. As the frame assembly is inserted into the inverted envelope, the envelope folds or rolls onto the frame assembly to encase the assembly and turn itself rightside out.

Side air bag modules containing inflatable air bags are installed at lateral sides of vehicular seats, particularly the outboard sides of seat bottoms and seat backs. During a collision, side air bags inflate to provide protection to occupants of a vehicle.

SUMMARY OF THE INVENTION

It is desirable to provide a side air bag closeout assembly that is adapted for use with envelopes formed by trim covers. In particular, it is desirable to provide a closeout assembly that is adapted for trim cover envelopes that are inverted prior to being drawn over a frame and cushion subassembly.

This invention includes a side air bag closeout assembly for vehicular seats and a method of installing the closeout assembly. The closeout assembly is particularly adapted for trim cover envelopes that are inverted prior to being drawn over a seat frame and cushion subassembly. The closeout assembly provides an aesthetically pleasing appearance after installation on a seat.

In a preferred embodiment, a vehicular seat assembly includes a seat bottom defining an occupant seating area. The seat bottom includes a cushion covered by a trim cover spanning opposed lateral sides of the seat bottom. A seat back defines an occupant back support and includes a cushion covered by a trim cover spanning opposed lateral sides of the seat back. An opening is formed in the cushion at one of the lateral sides of the seat back. An opening is formed in the trim cover at one of the lateral sides of the seat back A cup is received in the opening formed in the cushion. A retaining ring is secured to the trim cover about the opening formed in the trim cover and attached to the cup.

In other embodiments of this invention, a side air bag closeout assembly according to this invention can be installed in a lateral side of a seat bottom. Installation of the closeout assembly in a seat bottom can be in lieu of or in additional to the closeout assembly installed in a lateral side of a seat back as described.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is a sectional view of the assembled closeout assembly and side air bag module illustrated in FIG. 2.

FIG. 4 is an enlarged perspective view of a retaining ring of the closeout assembly illustrated in FIGS. 2 and 3 illustrating tabs projecting from its sides.

FIGS. 5A–5E illustrate successive steps of a preferred method of installing a side air bag closeout assembly according to this invention.

FIG. 6 is a partial perspective view of second embodiments of a cup and a retaining ring for the closeout assembly according to this invention.

FIG. 7 is a perspective view of a portion of a second embodiment of a vehicular seat assembly according to this invention illustrating a first side air bag module mounted on a lateral side of a seat back and a second side impact air bag module mounted on a lateral side of a seat bottom.

DETAILED DESCRIPTION OF THE PREFERRED EMBODIMENTS

Figure 1:
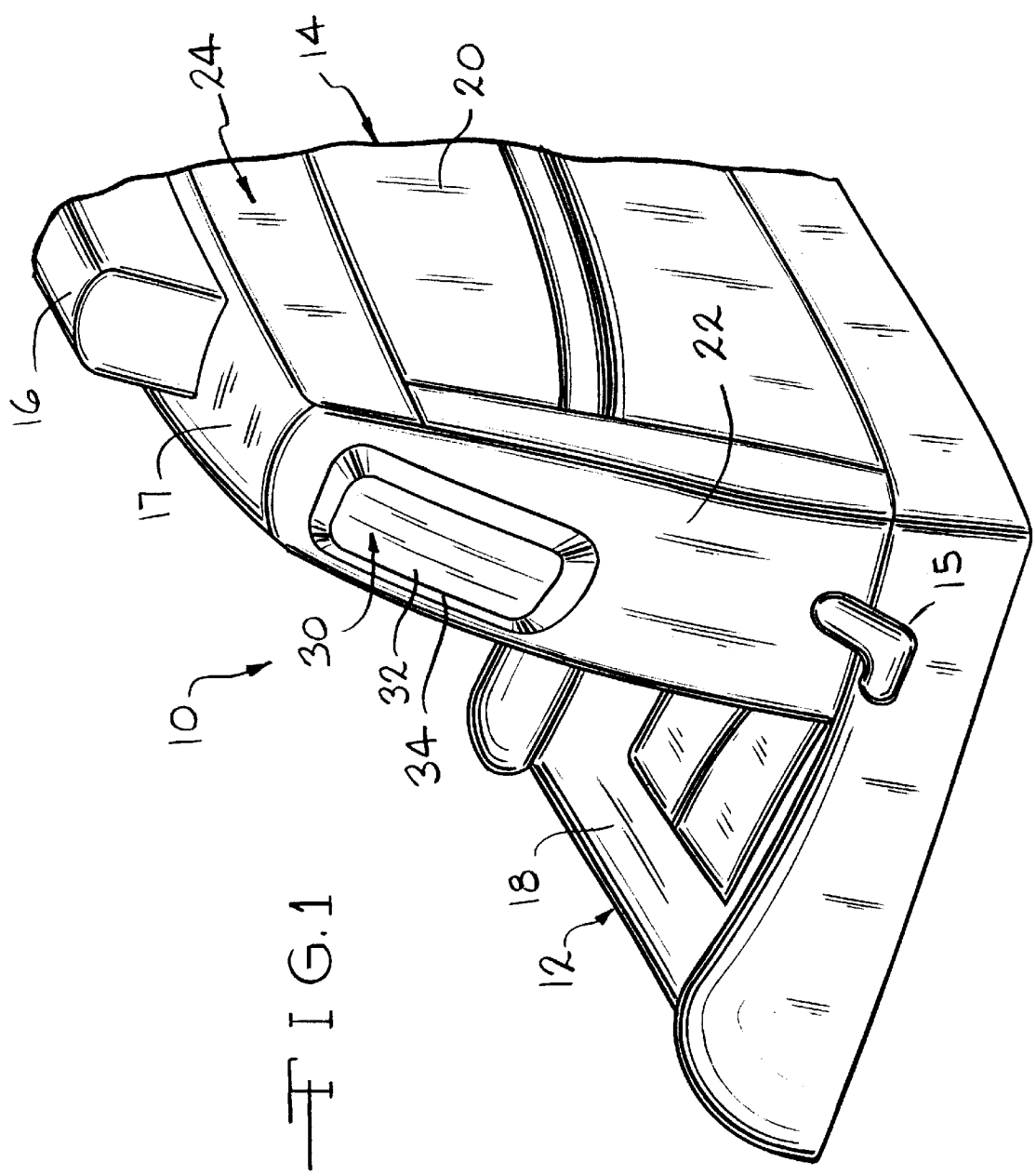
FIG. 1 is a perspective view of a portion of a vehicular seat assembly according to this invention illustrating a side air bag module mounted on a lateral side of a seat back.

A vehicular seat assembly according to this invention is indicated generally at 10 in FIG. 1. The seat assembly 10 includes a generally horizontal seat bottom 12 upon which an occupant sits and a generally upright seat back 14 that supports an occupant's back. A hinge mechanism 15 permits pivotal fore and aft movement of the seat back 14 relative to the seat bottom 12. If desired, a headrest 16 can be provided at an upper surface 17 of the seat back 14.

The seat bottom 12 includes a seat bottom frame (not illustrated) typically formed from a tubular metal. The seat bottom frame supports a contoured cushion (not illustrated) which is encased by a trim cover 18. The cushion and trim cover 18 span opposed lateral sides of the seat bottom 12. The cushion can be formed from any desired material including resilient polyester. The trim cover 18 can be formed from any desired material including cloth, vinyl, and leather.

The seat back 14 includes the upper surface 17, a front surface (not visible in FIG. 1), a rear surface 20, and lateral side surfaces 22. In the orientation of FIG. 1, only an outboard side surface 22 is shown. A trim cover 24 encases the seat back 14. Preferably, the trim cover 24 is formed into a known envelope to receive a seat back frame and cushion, described in detail below. The trim cover 24 can be formed from any desired material including cloth, vinyl, and leather.

A side impact air bag module 30 is mounted on the outboard lateral side 22 of the seat back 14. The air bag module 30 includes a central, rectangular panel 32 that covers an inflatable air bag (illustrated only in FIG. 3). During a collision, the air bag is inflated to provide protection to an occupant of the seat assembly 10. As the air bag inflates, the panel 32 is exploded away from the air bag module 30. A lip 34 is formed about the perimeter of the panel 32. As described below, the trim cover 24 is tucked and retained beneath the lip 34.

Figure 2:
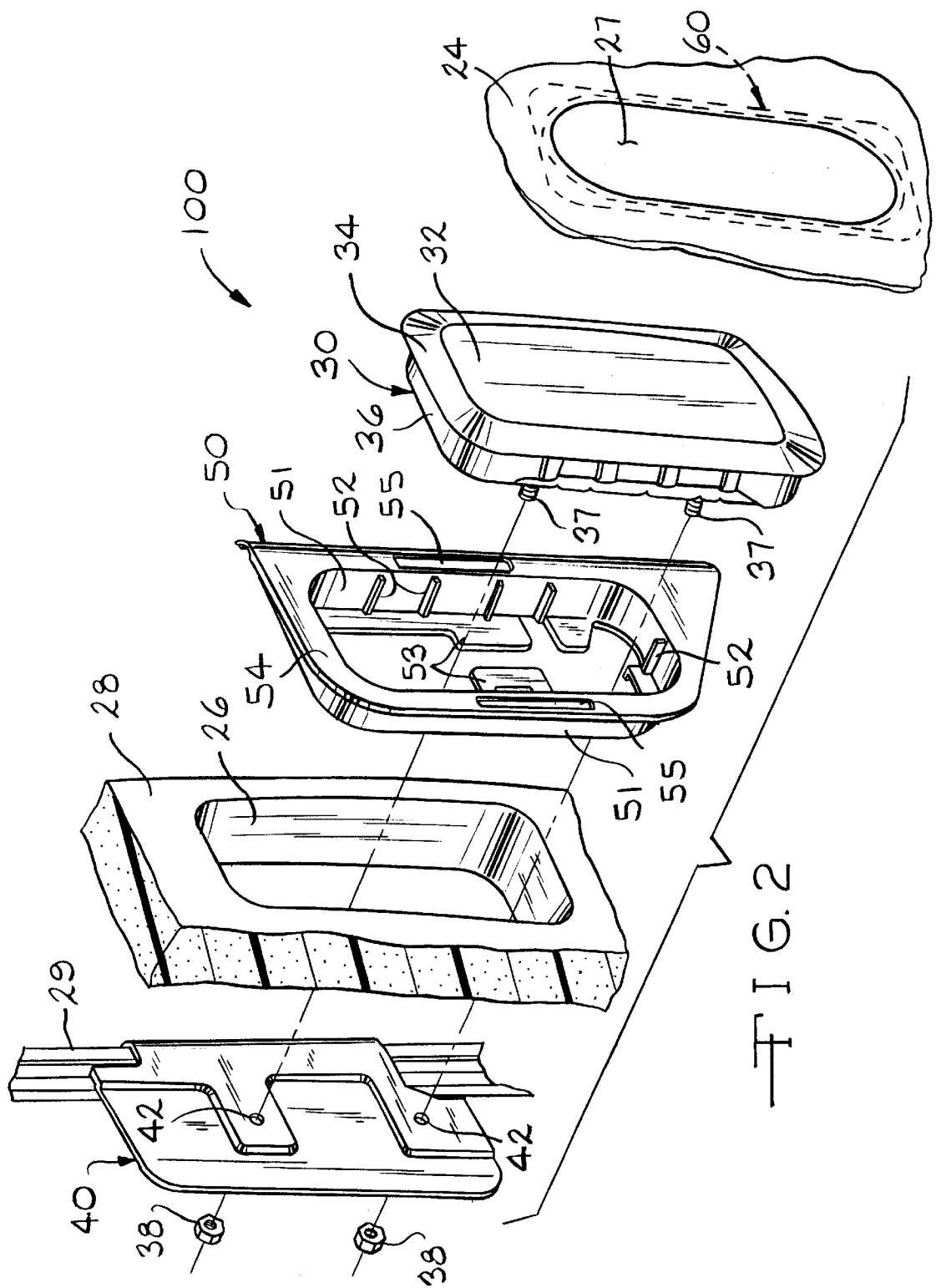
FIG. 2 is an enlarged, exploded perspective view of a closeout assembly according to this invention mounting the side air bag module to the seat back of FIG. 1.

As illustrated in FIGS. 2 and 3, a closeout assembly 100 according to this invention mounts the air bag module 30 on the seat back 14 and provides a neat fit of the trim cover 24 about the air bag module 30. The closeout assembly 100 is not visible when a seat back 14 is assembled, and thus is hidden beneath the trim cover 24 in FIG. 1. The closeout assembly 100 cooperates with an opening 26 formed in a lateral side surface of a cushion 28 of the seat back 14. The trim cover 24 encases the cushion 28, formed from any desired resilient material. The cushion 28 is supported by a seat back frame 29 typically formed from a tubular metal.

A bracket 40 is mounted on the seat back frame 29 by any desired means. Openings 42 are formed in the bracket 40. The cushion 28 is placed over the bracket 40 so that the opening 26 is aligned with the bracket 40.

The air bag module 30 includes a generally rectangular housing 36. The housing 36 includes projecting threaded studs 37 that pass through openings 42 and are received into nuts 38 provided on an opposite side of the bracket 40. The housing 36 contains an inflatable air bag 39 (illustrated only in FIG. 3) that is deployed during a collision and forces the panel 32 away from the housing 36.

The closeout assembly 100 includes a cup 50 inserted into the opening 26 to provide a rigid peripheral rim around the inner circumference of the opening 26. The cup 50 is preferably formed from a rigid, lightweight material such as polypropylene. The cup 50 includes a rearwardly extending, generally rectangular wall 51 that lines the opening 26. Preferably, the wall 51 does not extend beyond a thickness of the cushion 28. If desired, a plurality of ribs 52 can be provided along the wall 51 to increase stiffness of the wall 51 and the cup 50. Also, a plurality of radially inwardly projecting flanges 53 can be provided at a termination of the wall 51 to provide a support for a rear surface of the air bag module 30. Preferably, open areas are provided between the flanges 53 so that the studs 37 of the air bag housing 36 can pass to the openings 42 in the bracket 40.

The cup 50 also includes a lip 54 formed about the perimeter of the wall 51. Preferably, the lip 54 extends outwardly and generally perpendicular to the wall 51, thus forming a generally L-shaped cross section. Predetermined slots or openings 55 are formed in the lip 54. Preferably, the slots 55 are formed in the lip 54 along lateral sides of the cup 50.

A retaining ring 60 is attached to the trim cover 24 to provide a rigid peripheral rim about an opening 27 formed in the trim cover 24. The opening 27 is aligned with opening 26 formed in the cushion 28. The retaining ring 60 is placed on and secured to an inner surface 24A of the trim cover 24. Preferably, the retaining ring 60 is formed as a generally rectangular ring from a rigid, lightweight material such as polypropylene. The retaining ring 60 includes a central opening bounded by sides 62A and 62B and ends 64A and 64B. As illustrated in FIG. 4, tabs 66A and 66B are formed on respective sides 62A and 62B. The tabs 66A and 66B are aligned with the slots 55 in the cup 50. If desired, the tabs 66A and 66B can be angled outwardly away from the central opening of the retaining ring 60.

Preferably, flaps 70 from the trim cover 24 bordering the opening 27 are wrapped around the retaining ring 60. The flaps 70 can be secured to an inner surface 24A of the trim cover 24 by any desired means including stitching indicated at 72, adhesive, etc.

After the cup 50 has been inserted into opening 26, the air bag module 30 is seated in the cup 50. The trim cover 24 having the retaining ring 60 is placed over the seat back 14 so that the retaining ring 60 is adjacent the air bag module 30. The retaining ring 60 with the wrapped trim cover flaps 70 is worked around the lip 34 of the air bag module 30 so that the retaining ring 60 is positioned between the lip 34 and the cup 50 as illustrated in FIG. 3. As the retaining ring 60 is tucked beneath the lip 34, the tabs 66A and 66B are inserted into the slots 55 to attach the retaining ring 60 to the cup 50. The retaining ring 60 provides a neat appearance of the trim cover 24 around the panel 32. Also, the rigid retaining ring 60 provides resistance to tampering of the air bag module 30.

Figure 5B:
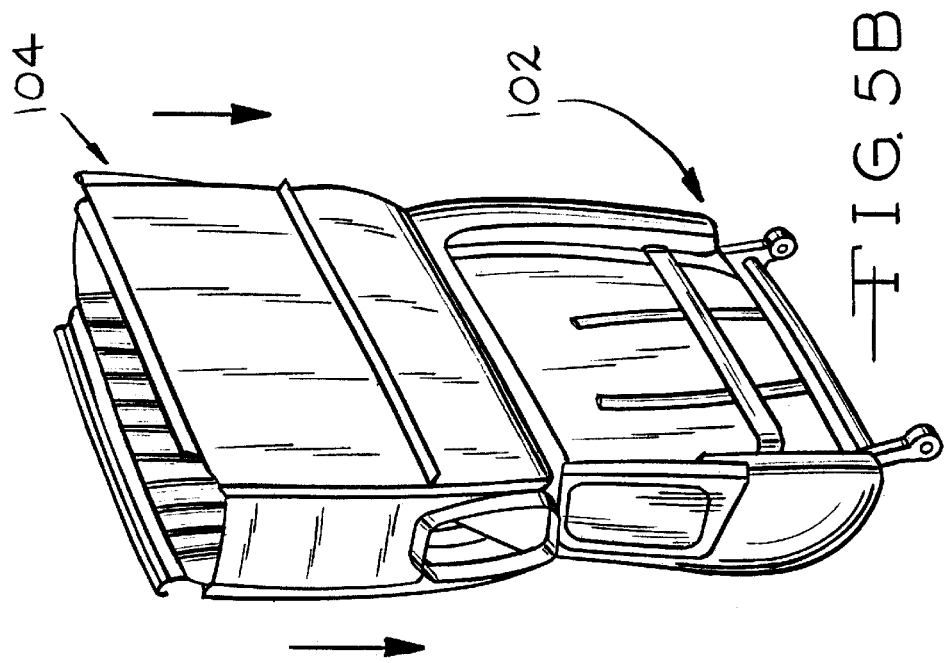
Figure 5A:
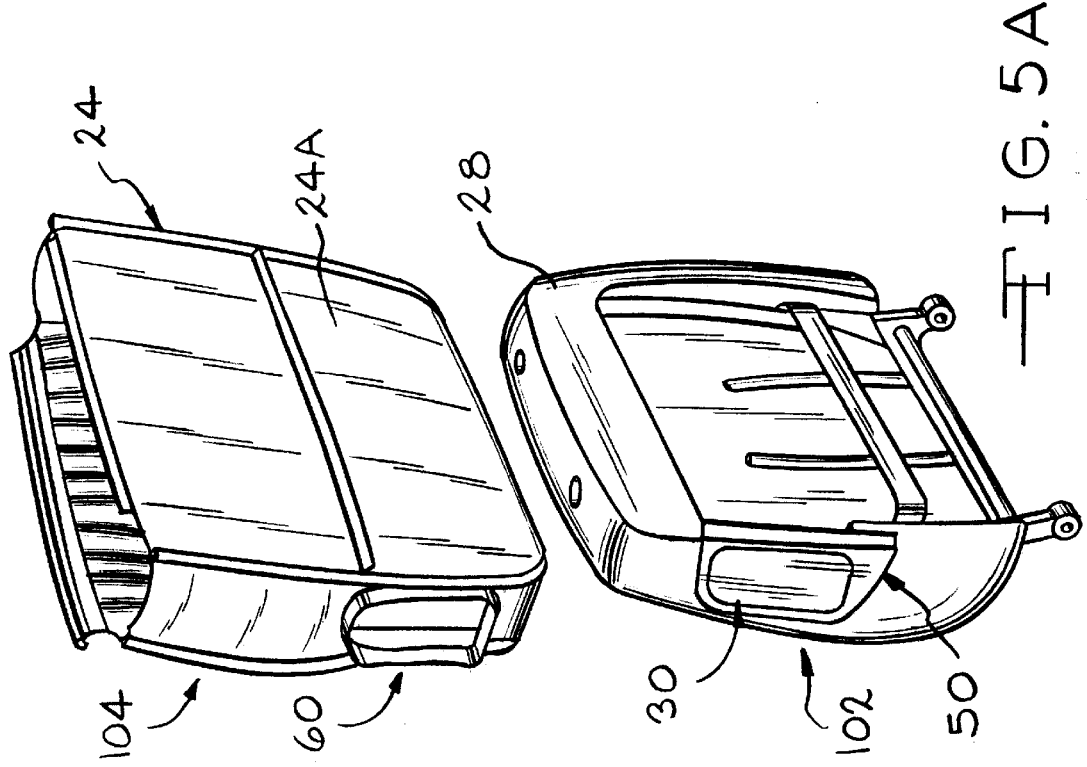

A preferred method of installing the side airbag closeout assembly 100 onto a vehicular seat 10 is illustrated as successive steps in FIGS. 5A, 5B, 5C, 5D and 5E. As illustrated in FIG. 5A, the seat back 14 having the cup 50 and side air bag module 30 mounted thereon is preformed and provided as a subassembly 102. The trim cover 24 having the retaining ring 60 secured to its inner surface about opening 27 is preformed and provided as a subassembly 104. The trim cover subassembly 104 is inverted so that the inner surface 24A is turned outwardly.

As illustrated in FIGS. 5B, 5C, and 5D, the trim cover subassembly 104 is drawn over the seat back subassembly 102 so that the inner surface 24A is turned inside and placed against the seat back subassembly 102. As the seat back subassembly 102 is received in the trim cover subassembly 104, the retaining ring 60 is placed over and about the air bag module 30. When the trim cover subassembly 104 is completely drawn over the seat back assembly 102 (as shown in FIG. 5D), the trim cover 24 encases the cushion 28 without the need for zippers, fasteners, or other devices.

Figure 5E:
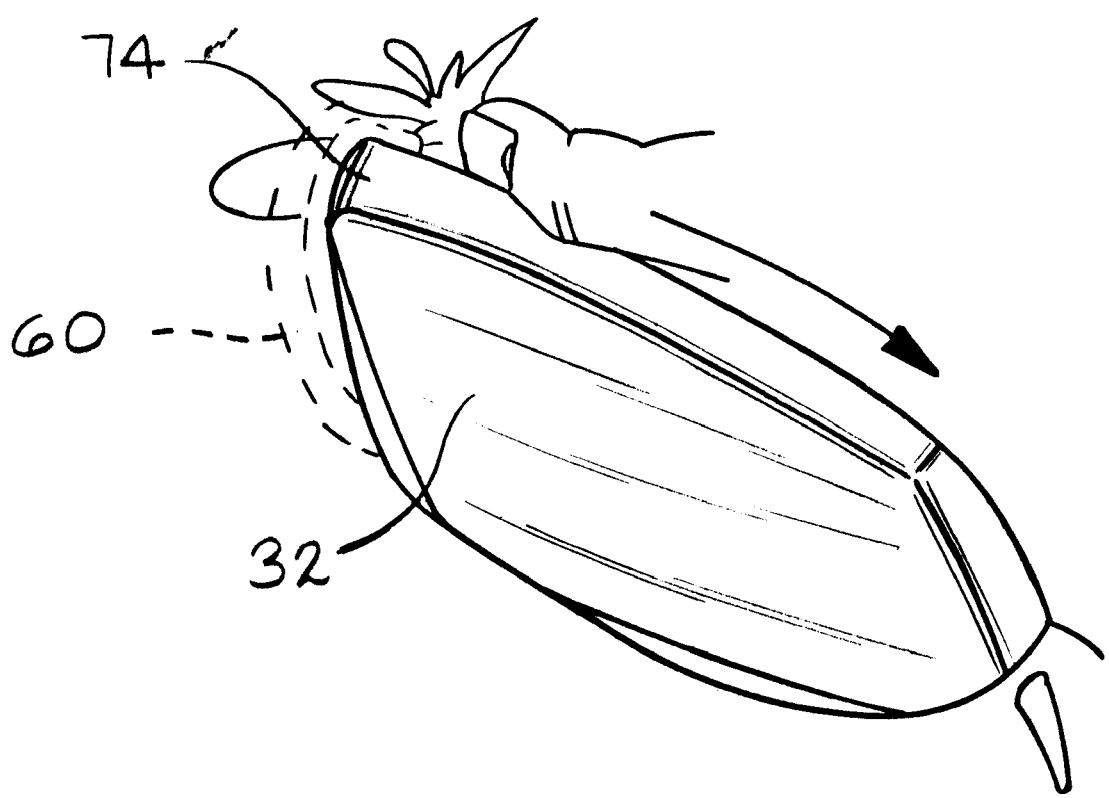

A final installation step is illustrated in FIG. 5E. The wrapped retaining ring 60 is worked or tucked beneath the lip 34 of the side air bag module 30 so that tabs 66A and 66B are received in respective slots 55. The outwardly projecting tabs 66A and 66B attach the retaining ring 60 to the cup 50. This step can be performed manually if desired.

The closeout assembly 100 provides a trimmed opening in the seat back 14 and permits easy access to the air bag module 30. During a collision, the air bag module 30 deploys without substantial damage to the trim cover 24 and cushion 28.

Portions of second embodiments of a cup 150 and a retaining ring 160 according to this invention are illustrated in FIG. 6. The cup 150 and the retaining ring 160 can be substituted for cup 50 and retaining ring 60 in the closeout assembly 100. The cup 150 includes an inwardly projecting wall 151, ribs 152, flanges 153, and a lip 154. A plurality of slots 155 is formed in the lip 154. The retaining ring 160 includes sides 162 and ends 164. A plurality of tabs 166 are formed on the sides and aligned with the slots 155 of the lip 154. If desired, hook portions 168 can be provided on the tabs 166 to provide a snap fit when inserted into a respective slot 155. When the trim cover 24 is fitted over the cushion 28, the retaining ring 160 is aligned with the cup 150. The tabs 166 and hooks 168 are inserted into respective slots 155 so that the retaining ring 160 and trim cover 24 are attached to or retained on the cup 150. In other embodiments, various desired patterns of slots 155 and tabs 166 can be provided on the cup 150 and retaining ring 160.

A second embodiment of a vehicular seat assembly according to this invention is indicated generally at 200 in FIG. 7. The seat assembly includes a seat bottom 212 and a seat back 214. A hinge mechanism 215 permits the seat back 214 to pivot relative to the seat bottom 212. If desired, a headrest 216 can be provided along an upper surface of the seat back 214. A first side air bag module 230 is mounted on a lateral side surface of the seat back 14. A second side air bag module 280 is mounted on a lateral side surface of the seat bottom 212. During a collision, the air bag modules 230 and 280 deploy to provide protection for an occupant. In other embodiments, a side air bag module 280 can be mounted only on a lateral side surface of the seat bottom 212. The side air bag modules 230 and 280 are mounted on respective sides by closeout assemblies 100 (not visible in FIG. 0) in a manner similar to that described for seat 10.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicular seat assembly comprising:

a seat bottom defining an occupant seating area, the seat bottom including a cushion covered by a trim cover spanning opposed lateral sides of the seat bottom;

a seat back defining an occupant back support, the seat back including a cushion covered by a trim cover spanning opposed lateral sides of the seat back;

an opening formed in the cushion at one of the lateral sides of at least one of the seat bottom or the seat back;

an opening formed in the trim cover at one of the lateral sides of at least one of the seat bottom or the seat back;

a cup received in the opening formed in the cushion;

an air bag module having a lip received in the cup; and a retaining ring secured to the trim cover about the opening formed in the trim cover and attached to the cup, wherein the retaining ring is positioned between the lip of the air bag module and the cup.

2. The vehicular seat assembly defined in claim 1 wherein the retaining ring is snap fitted onto the cup.

3. The vehicular seat assembly defined in claim 2 wherein the retaining ring includes a tab received in a corresponding slot formed in the cup.

4. The vehicular seat assembly defined in claim 3 wherein the cup includes an inwardly extending wall received in the opening of the cushion, wherein the lip of the cup is formed substantially perpendicular to the wall and includes the slot.

5. The vehicular seat assembly defined in claim 3 including a hook portion formed on the tab that cooperates with the slot to retain the retaining ring onto the cup.

6. The vehicular seat assembly defined in claim 3 including a plurality of tabs formed on the retaining ring received in a corresponding plurality of slots formed in the lip.

7. The vehicular seat assembly defined in claim 1 wherein:

openings are formed in the cushion and trim cover of each of the seat bottom and the seat back;

a cup is received in each of the openings in the cushions;

an air bag module having a lip is received in each of the cups; and a retaining ring is secured to the trim cover about each of the openings in the trim cover and attached to a corresponding cup, wherein each retaining ring is positioned between the lip of a corresponding air bag module and a corresponding cup.

8. A side air bag closeout assembly comprising:

a cup having a wall defining an opening, the cup including a lip formed about the wall, the lip including at least one slot;

a side air bag module received in the opening of the cup, the side air bag module including a lip;

a retaining ring positioned between the lip of the air bag module and the cup, the retaining ring having a tab fitted into the slot of the cup.

9. The side air bag closeout assembly defined in claim 8 wherein the tab is formed so as to retain the retaining ring on the cup.

10. The side air bag closeout assembly defined in claim 9 wherein the tab includes a hook portion for retaining the retaining ring on the cup.

11. The side air bag closeout assembly defined in claim 8 wherein the lip of the cup includes a plurality of slots and the retaining ring includes a plurality of tabs aligned with and received in the slots.

12. The side air bag closeout assembly defined in claim 11 wherein each of the tabs includes a hook portion for retaining the retaining ring on the cup.

13. A method of installing a side air bag closeout assembly on a vehicular seat, the method including the steps of:

providing an opening in a cushion of a vehicular seat;

providing an opening in a trim cover of a vehicular seat, the trim cover including an inner surface;

inserting a cup into the opening formed in the cushion;

inserting an air bag module into the cup;

securing a retaining ring to the inner surface of the trim cover about the opening formed in the trim cover; and attaching the retaining ring to the cup.

14. The method of installing a side air bag closeout assembly defined in claim 13 wherein the retaining ring is attached to the cup by inserting at least one tab formed on the retaining ring into a corresponding slot formed on the cup.

15. The method of installing a side air bag closeout assembly defined in claim 14 wherein a hook portion on the tab is snap fitted into a corresponding slot to retain the retaining ring on the cup.

16. The method of installing a side air bag closeout assembly defined in claim 13 including the step of drawing a trim cover over the cushion after the step of securing a retaining ring about the opening formed in the trim cover.

* * * * *